United States Patent [19]

Chang et al.

[11] Patent Number: 4,708,816

[45] Date of Patent: Nov. 24, 1987

[54] BLEACH COMPOSITION CONTAINING CONTROLLED DENSITY CAPSULES

[75] Inventors: Daniel M. Chang; Richard J. Wiersema, both of Pleasanton, Calif.

[73] Assignee: The Clorox Company, Oakland, Calif.

[21] Appl. No.: 825,959

[22] Filed: Feb. 4, 1986

Related U.S. Application Data

[63] Continuation of Ser. No. 574,545, Jan. 27, 1984, abandoned.

[51] Int. Cl.$^4$ .......................... C01B 11/06; C09K 3/00
[52] U.S. Cl. .......................... 252/186.25; 106/308 M; 252/187.26; 252/301.21; 427/213.36; 428/402.24
[58] Field of Search .................... 252/186.25, 187.26, 252/301.21; 427/213.36; 428/402.24; 106/308 M

[56] References Cited

U.S. PATENT DOCUMENTS

| | | | |
|---|---|---|---|
| 3,401,123 | 9/1968 | Brynko et al. | 428/402.24 X |
| 3,494,784 | 2/1970 | Coene et al. | 427/222 |
| 3,645,911 | 2/1972 | Van Besauw et al. | 264/4.6 |
| 3,663,442 | 5/1972 | Briggs | 252/95 |
| 3,666,680 | 5/1972 | Briggs | 252/301.21 |
| 3,684,722 | 8/1972 | Hynam et al. | 252/98 |
| 3,691,090 | 9/1972 | Kitajima | 427/213.36 |
| 3,701,763 | 10/1972 | Wada et al. | 526/128 |
| 3,850,899 | 11/1974 | Wada et al. | 526/114 |
| 3,855,178 | 12/1974 | White et al. | 524/392 |
| 3,878,037 | 4/1975 | Hansen et al. | 162/73 |
| 3,956,165 | 5/1976 | Hansen et al. | 252/182 |
| 3,975,280 | 8/1976 | Hachmann et al. | 252/102 |
| 3,988,343 | 10/1976 | Lilyquist | 524/89 |
| 3,992,317 | 11/1976 | Brichard et al. | 252/186.32 |
| 4,009,139 | 2/1977 | Widder et al. | 524/460 |
| 4,049,845 | 9/1977 | Lozier et al. | 427/68 |
| 4,058,480 | 11/1977 | Lohmann et al. | 252/301.21 |
| 4,071,463 | 1/1978 | Steinhauer | 252/103 |
| 4,072,624 | 2/1978 | Croome et al. | 252/301.35 |
| 4,174,289 | 11/1979 | Sorgenfrei et al. | 252/103 |
| 4,269,740 | 5/1981 | Woods et al. | 525/235 |
| 4,271,030 | 6/1981 | Brierley et al. | 252/98 |
| 4,334,933 | 6/1983 | Abe et al. | 106/305 |
| 4,526,700 | 7/1985 | Hensley et al. | 252/102 |

FOREIGN PATENT DOCUMENTS

| | | |
|---|---|---|
| 0009250 | 2/1980 | European Pat. Off. |
| 1113348 | 5/1968 | Netherlands. |
| 1025694 | 4/1966 | United Kingdom. |
| 1329086 | 8/1970 | United Kingdom. |

OTHER PUBLICATIONS

Kirk-Othmer: *Encyclopedia of Chemical Technology*, Third Edition, vol. 17, John Wiley & Sons, New York, 1982, p. 827.

*Primary Examiner*—Richard D. Lovering
*Attorney, Agent, or Firm*—Majestic, Gallagher, Parsons & Siebert

[57] ABSTRACT

Microcapsules having density controlled to be close to that of an aqueous solution are provided which may be dispersed in liquid bleaching solutions and which are useful as coloring or whitening agents.

5 Claims, No Drawings

BLEACH COMPOSITION CONTAINING CONTROLLED DENSITY CAPSULES

This is a continuation of application Ser. No. 574,545, filed Jan. 27, 1984 and now abandoned.

FIELD OF THE INVENTION

The present invention relates generally to microcapsules useful as coloring or whitening agents for fabrics, and particularly to microcapsules having a controlled density distribution which are dispersed in aqueous bleaching solutions.

BACKGROUND ART

A variety of coloring and whitening agents are known and useful in treating fabrics. For example, bluing agents are used to mask the undesirable yellow color of fabrics following laundering. Typical coloring agents include dyes and pigments, such as ultramarine blue, and optical brighteners.

Many coloring agents are substantially insoluble in aqueous solutions, and when added during a laundering process are in particulate form. During laundering, if the particles of coloring agents are sufficiently small and dispersed in the laundry solution, then the particles become deposited on the fabrics and mask the yellowed color of the fabrics by partially compensating for the absorption of short wavelength blue. Some particulate coloring agents lose effectiveness in oxidizing environments, such as hypochlorite bleach solutions, although addition of such agents in conjunction with laundering additives is a convenient means of treating fabrics.

U.S. Pat. No. 4,271,030, issued June 2, 1981, inventors Brierley et al., discloses a liquid hypochlorite bleach having a particulate pigment, such as ultramarine blue, which is said to be stably suspended in the composition by means of a flocculant filling at least 50% of the volume of the composition.

U.S. Pat. No. 3,666,680, issued May 30, 1972, inventor Briggs, discloses an encapsulating material for particles said to be useful in protecting optical brightening agents in aqueous bleach. The encapsulating material disclosed is a styrene polymer, and encapsulation is by means of a two-stage polymerization method.

Prior methods for making encapsulated brightening agents have been multi-step, or difficult to control, and known compositions with brightening agents in aqueous solutions have posed sedimentation, coagulation or stability problems.

SUMMARY OF THE INVENTION

Accordingly, it is an object of the present invention to provide a simple and efficient method for preparing microcapsules which are stable in aqueous bleaching solutions and useful as coloring agents for fabrics.

It is another object of the present invention to provide microcapsules which have a controlled density distribution, for example a density which is controlled to be closely similar to that of an aqueous bleaching solution, and which are readily dispersed in the aqueous solution.

Additional objects, advantages, and novel features of the invention will be set forth in part in the description which follows, and in part will become apparent to those skilled in the art on examination.

In one aspect of the present invention, a composition useful for treating fabrics is provided comprising a liquid bleaching solution having a predetermined solution density and a plurality of microcapsules dispersed in the bleaching solution. The plurality of microcapsules have a density distribution in the bleaching solution within about 0.005 to about 0.01 g/cc of the solution density. Preferred microcapsule embodiments have an outer layer and an inner core, with a density of the outer layer being less than the solution density, and the inner core being a coloring agent.

In another aspect of the present invention, a method for making pigment encapsulates with a controlled density distribution is provided which comprises the steps of providing an aqueous solution including particulates of a diameter of from about 0.1 micron to about 500 micron and in an amount up to about 15 wt.% of the solution, dispersing a quantity of polyethylene and sufficient surfactant into the aqueous solution, and admixing a coagulating agent into the solution to form encapsules.

Practice of the present invention results in microcapsules useful as coloring agents for fabric treatment which may be dispersed in aqueous bleaching solutions.

BEST MODE OF CARRYING OUT THE INVENTION

Broadly, microcapsules in accordance with the present invention have diameters from about 0.01 micron to about 500 micron, more preferably from about 0.1 micron to about 10 micron, most preferably about 1 micron, and have an outer layer and an inner core. The inner core is derived from a particulate, substantially water insoluble material, which functions as a coloring agent for fabrics.

Coloring agents for forming the core material of microcapsules in accordance with the present invention may include various dyes and pigments and fluorescing compounds. For example, among the known and useful fluorescing compounds are coumarin, pyrazine, the azoles, and anthraquinones. Suitable dyes and pigments include ultramarine blue, Sulfanthrene dyes (available from E. I. DuPont de Nemours), and monastral colorants (available from E. I. DuPont de Nemours).

Coloring agents useful in the present invention are substantially water insoluble and have a higher density than the aqueous solutions in which they are desirably dispersed for fabric treatment. For example, ultramarine blue has a density of 2.35 g/cc, and ultramarine blue particles begin settling out of aqueous solution within about four hours even when the ultramarine blue particles are of very small particle sizes.

The inner core of microcapsules in accordance with the present invention will generally have a diameter of at least about 0.1 micron and will usually be within the range of from about 0.1 to about 10 microns. Unencapsulated particles of this size will settle out of an unagitated solution due to their higher density.

Microcapsules in accordance with the present invention may be dispersed in aqueous solutions, and are preferably made with a controlled density distribution which is closely similar to a solution density of the desired solution in which the microcapsules are to be dispersed. A particularly preferred composition is wherein the microcapsules are dispersed in a liquid bleaching solution, such as hypochlorite bleach, and have a density of about 1.0 to 1.2 g/cc plus or minus about 0.01, more preferably plus or minus about 0.005.

Conventional liquid hypochlorite bleaches used for laundry operations contain sodium hypochlorite which aids in removing stains and soils from textiles by virtue of the strong oxidizing power of the hypochlorite ion released in aqueous solution and have a density of about 1.08 g/cc. Aqueous solutions of sodium hypochlorite are inherently basic as sodium hypochlorite is the salt of a weak acid (hypochlorous acid) and a strong base (sodium hydroxide).

Since it is well known that hypochlorite ion is stabilized by basic solutions, conventional aqueous hypochlorite bleaches usually incorporate small amounts of sodium hydroxide or sodium carbonate, which adjust the solution to a pH of about 10.5 to 12.0. Aqueous hypochlorite bleaches can also include additional components and be of higher pH. For example, U.S. Pat. No. 4,151,104, issued Apr. 24, 1979, inventors Alvarez et al., discloses a liquid hypochlorite bleach with a pH of from about 11 to 14, and U.S. Pat. No. 4,071,463, issued Jan. 31, 1978, inventor Steinhauer, discloses an aqueous hypochlorite solution which includes synthetic detergents.

Broadly, a method for making pigment encapsules with a controlled density distribution comprises the steps of providing an aqueous solution including pigment particulates, dispersing a quantity of relatively low density polymer and surfactant into the aqueous solution, and admixing a suitable coagulating agent therein.

By varying the weight ratio of polymer which forms the outer layer and coloring agent which forms the inner core, microcapsules with a variety of desired densities can be prepared. For example, microcapsules with ultramarine blue as the inner layer will usually have a weight ratio of outer layer to inner core between about 4:1 to about 7:1, preferably about 5:1 to 6:1.

A particularly preferred embodiment is wherein microcapsules having an average diameter of about 1 micron are prepared with an average density of about 1.075 g/cc and a density distribution of about +/− 0.005 g/cc. The preferred microcapsules are readily dispersed in a liquid bleaching solution, such as hypochlorite bleach having a density of about 1.078 g/cc, preferably in an amount of about 0.5 to about 1 wt.% with respect to the hypochlorite solution.

A theoretical density of the microcapsules can be predicted from Equation (1) below:

$$\frac{M_1}{M_2} = \left[\frac{d_1}{d_2}\right]\left[\frac{d_2 - \bar{d}}{\bar{d} - d_1}\right], \text{ or} \tag{1}$$

$$\bar{d} = \frac{\left(1 + \frac{M_1}{M_2}\right) d_2}{1 + \left(\frac{M_1}{M_2}\right)\left(\frac{d_2}{d_1}\right)}$$

where the average microcapsule density is $\bar{d}$ (g/cc); weight (i.e., mass) of polyethylene is $M_1$ (gram); weight (i.e., mass) of the inner core material is $M_2$ (gram); density of the polymer is $d_1$; and density of inner core material is $d_2$.

For example, if $M_1/M_2 = 3.04$, $d_1 = 0.915$ g/cc and $d_2 = 2.35$ g/cc then the theoretical microcapsule density would be 1.08 g/cc. Stokes' law is useful in predicting suitable microcapsules diameters and acceptable average densities in order that microcapsules neither float nor settle in the aqueous solution in which they are dispersed, as illustrated by Equation (2) below:

$$U_0 = 1/18\eta(D^2 \cdot \Delta d \cdot g) \tag{2}$$

where $U_o$ is the terminal settling or floating velocity (m/sec);

$\eta$ is viscosity (kg/sec-m);

D is the microcapsule diameter (meter);

$\Delta d$ is the difference in density between the microcapsules and the aqueous solution; and g is the gravitational constant (9.8 newton/m-sec$^2$).

The critical terminal velocity (which can be offset by Brownian movement and thermal fluctuation) is $1.2 \times 10^{-8}$ m/sec. Thus, for example, microcapsules with an average density of 1.075 g/cc and an average diameter of 1.5 micron will have a predicted terminal velocity of $3.7 \times 10^{-9}$ m/sec in hypochlorite bleach, which is substantially smaller than the critical terminal velocity.

The following experimental methods, materials and results are described for purposes of illustrating the present invention. However, other aspects, advantages and modifications within the scope of the invention will be apparent to those skilled in the art to which the invention pertains.

EXPERIMENTAL

The general method for making pigment encapsules in accordance with the invention is by dispersing a quantity of particles to be encapsulated in aqueous solution, adding sufficient polymer emulsion, stirring (for example, mechanically at about 300–800 rpm) in the presence of a suitable surfactant to form an emulsion, adjusting the temperature, and admixing a coagulating agent into the emulsified solution while maintaining the temperature to within a desired range. The microcapsules are then allowed to cool to room temperature.

Preferred polymers for forming the emulsion are ethylene derived hydrocarbon polymers, which have a relatively low density and which may be emulsified in aqueous systems by means of suitable surfactants. Combined polymer-surfactant emulsions suitable for practice of the present invention are commercially available from various sources. Particularly preferred are "Poly EM20" available from Rohm & Haas, "Bareco 25E or EM69" available from Petrolite Corporation, and "AC 580-20" available from Allied Chemical. Table I, below, illustrates data for these four polyethylene and surfactant systems.

TABLE I

|  | Poly EM20 | Bareco 25E | Bareco EM69 | AC 580-20 |
|---|---|---|---|---|
| Particle Size (μ) | 0.09 | 0.09 | 0.20 | 0.13 |
| Density of Polymer (g/cc) | 0.91 | 0.97 | 0.94 | 0.93 |
| % Active Solids | 40 | 25 | 40 | 20 |
| Surfactant Type | Anionic | Anionic | Anionic | Anionic |
| Melting Point of Polymer (°C.) | 90 | 95 | 90–100 | 102 |

Suitable coagulating agents include water soluble salts which provide polyvalent cations. A particularly preferred coagulating agent is calcium chloride.

The densities of microcapsules prepared in accordance with the present invention were determined with a density gradient column containing an isopropanol/ethylene glycol mixture for a saturated NaBr solution. The column was calibrated with glass beads of known density. A drop of the solution including microcapsules was placed at the head of the column and allowed to equilibrate (forming a narrow blue band) and the density was recorded. Examples I through IV, below, illustrate the preparation of thirteen microcapsule compositions in accordance with the present invention using four different polyethylene and surfactant systems and encapsulating ultramarine blue ("UMB"). The density distribution in each preparation of microcapsules was found to be quite narrow (+/− 0.005 g/cc).

EXAMPLE I

Composition number 5, below, was prepared by dispersing 4.35 g ultramarine blue 5151 (available from Whittaker, Clark & Daniels, Inc.) in 27 g water and 47.73 g of PolyEM20. The dispersion was warmed to 75°–80° C. and 10 g calcium chloride (10% soln.) was added slowly in 10 minutes to affect the encapsulation. The resultant encapsules were then cooled to room temperature and diluted to 0.5 wt.% (based on ultramarine blue) by adding hypochlorite bleach. Composition numbers 1–4 and 6 were prepared in a similar manner.

| Composition No. | Wt. Ratio Polyethylene to UMB | $\bar{d}$ (g/cc) |
|---|---|---|
| 1 | 6.19:1 | 0.998 |
| 2 | 4.01:1 | 1.056 |
| 3 | 4.19:1 | 1.051 |
| 4 | 4.19:1 | 1.063 |
| 5 | 4.39:1 | 1.075 |
| 6 | 4.58:1 | 1.062 |

EXAMPLE II

Composition numbers 7 and 8, below, were prepared in a similar manner to Example I, above, but with the use of Bareco 25E as the polymer-surfactant emulsion and executed at room temperature.

| Composition No. | Wt. Ratio Polyethylene to UMB | $\bar{d}$ (g/cc) |
|---|---|---|
| 7 | 4.91:1 | 1.08 |
| 8 | 5.20:1 | 1.05 |

EXAMPLE III

Composition numbers 9–11, below, were prepared in a similar manner to Example I, above, but with the use of Bareco EM-69 as the polymer-surfactant emulsion at room temperature.

| Composition No. | Wt. Ratio Polyethylene to UMB | $\bar{d}$ (g/cc) |
|---|---|---|
| 9 | 5.0:1 | 1.07 |
| 10 | 4.5:1 | 1.06 |
| 11 | 4.0:1 | 1.09 |

EXAMPLE IV

Composition numbers 12 and 13, below, were prepared in a similar manner to Example I, above, but with the use of AC580-20 as the polymer-surfactant emulsion at room temperature.

| Composition No. | Wt. Ratio Polyethylene to UMB | $\bar{d}$ (g/cc) |
|---|---|---|
| 12 | 4.0:1 | 1.07 |
| 13 | 3.8:1 | 1.06 |

Preferred compositions in accordance with the present invention comprise an aqueous hypochlorite solution and sufficient of the inventive microcapsules so as to provide functional brightening.

Hypochlorite ion is unstable over a period of time and changes ultimately to chloride ion and chlorate when in aqueous solution with a corresponding loss of available chlorine. Overall the decomposition of hypochlorite ion to chloride represents an undesirable loss of oxidizing power of the solution during shelf life. The chemical stability of hypochlorite in the presence of the inventive microcapsules was determined at 21° C., 32° C., and 38° C. over a 14 day period with initial pH between 11.2 to 11.6 and was found to be acceptable.

The bluing performances of several inventive compositions and control compositions were evaluated by washing unscoured, 100% cotton swatches in the presence of Tide detergent and the various compositions and instrumentally measuring the increase in whiteness of the swatches. Washings were done in Kenmore washing machines in about 66 liter of industrially soft water at 100° F. containing 102 g of Tide detergent and 256 g of the respective composition samples. Runs with Tide alone and Tide plus bleach (256 g) were done as controls. A wash load consisted of five swatches and five pounds of 65/35 polyester/cotton ballast.

Reflectance values (L, a, b) of each swatch were measured instrumentally with a Gardner XL-31 colorimeter and whiteness values (W) were calculated using the Stensby equation: $W = L + 3a - 3b$. Increases in whiteness ($\Delta W$) were calculated by subtracting the initial whiteness value from the post-treatment values. LSD (least significant difference) values were calculated using standard equations. Values of $\Delta W$ determined with the UV (Novial) filters in place in the colorimeter provided a measure of the bluing effect of the samples. Values of $\Delta W$ determined without the filters in place provided a measure of the bluing benefit of the samples plus any enhancement of the detergent brighteners that might occur in these systems.

Table II, below, illustrates the results of performance testing for three samples (1–3) including ultramarine blue and full strength, hypochlorite bleach. Samples 1 and 2 were encapsulated UMB compositions in accordance with the present invention. Sample 3 used unencapsulated ultramarine blue. Sample 4 used only detergent, while Sample 5 used detergent and bleach.

TABLE II

| | Whiteness Increase | | |
|---|---|---|---|
| | 1 wash cycle | 3 wash cycles | 5 wash cycles |
| Sample No. (with Novial filters) | | | |
| 1 (encapsulated UMB at .1 wt. %) | 2.34 | 4.03 | 5.97 |
| 2 (encapsulated UMB at .5 wt. %) | 3.48 | 5.83 | 10.08 |
| 3 (unencapsulated | 3.89 | 6.51 | 9.13 |

TABLE II-continued

|  | Whiteness Increase | | |
| --- | --- | --- | --- |
|  | 1 wash cycle | 3 wash cycles | 5 wash cycles |
| UMB at .5 wt. %) | | | |
| 4 detergent | 0.38 | 1.47 | 2.18 |
| 5 detergent & bleach | 1.21 | 2.17 | 4.22 |
| LSD | .39 | .55 | .53 |
| Sample No. (without Novial filters) | | | |
| 1 (encapsulated UMB at .1 wt. %) | 14.06 | 25.33 | 31.26 |
| 2 (encapsulated UMB at .5 wt. %) | 16.95 | 30.71 | 37.47 |
| 3 (unencapsulated UMB at .5 wt. %) | 21.43 | 28.13 | 35.82 |
| 4 detergent | 24.40 | 31.32 | 35.68 |
| 5 detergent & bleach | 15.49 | 27.06 | 28.46 |
| LSD | .59 | .64 | .58 |

The above data demonstrates that there is a bluing performance benefit with compositions in accordance with the present invention and that the polymer of the encapsules does not interfere with the bluing function.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A composition useful for treating fabrics, comprising:
   a liquid hypochlorite bleaching solution having a predetermined solution density; and
   a plurality of microcapsules stably dispersed in the bleaching solution, the plurality of microcapsules having a controlled density distribution in the bleaching solution within about 0.05 g/cc of the solution density, the microcapsules having a polyethylene outer layer and an inner core selected from the group consisting of pigment, optical brightener and mixtures thereof, a density of the outer layer being less than the solution density, and a density of the inner core being greater than the solution density.

2. The composition as in claim 1 wherein the inner core is ultramarine blue.

3. The composition as in claim 1 or 2 wherein the solution density is about 1.08 g/cc and the outer layer of the microcapsules has a density of about 0.91 to about 0.97 g/cc.

4. The composition as in claim 3 or 2 wherein the microcapsules have a diameter between about 0.1 and 500 microns.

5. The composition as in claim 1 or 2 wherein the weight ratio of the outer layer with respect to the inner core is between about 4:1 and about 7:1.

* * * * *